United States Patent
Deshpande et al.

(10) Patent No.: US 10,647,906 B2
(45) Date of Patent: May 12, 2020

(54) WAX MODIFIER IN HYDROCARBON FLUID AND METHOD OF USING THE SAME

(71) Applicant: M-I L.L.C., Houston, TX (US)

(72) Inventors: Pradyumna Avinash Deshpande, Houston, TX (US); Chandrashekhar Yeshwant Khandekar, Katy, TX (US)

(73) Assignee: M-I L.L.C., Houston, TX (US)

( * ) Notice: Subject to any disclaimer, the term of this patent is extended or adjusted under 35 U.S.C. 154(b) by 136 days.

(21) Appl. No.: 15/837,620

(22) Filed: Dec. 11, 2017

(65) Prior Publication Data

US 2018/0163123 A1    Jun. 14, 2018

Related U.S. Application Data

(60) Provisional application No. 62/433,063, filed on Dec. 12, 2016.

(51) Int. Cl.

| | |
|---|---|
| *C09K 8/03* | (2006.01) |
| *C09K 8/524* | (2006.01) |
| *F17D 3/12* | (2006.01) |
| *C10G 75/04* | (2006.01) |
| *C11C 1/00* | (2006.01) |
| *C08L 91/06* | (2006.01) |
| *C10L 1/198* | (2006.01) |
| *C08B 37/00* | (2006.01) |
| *C10L 10/14* | (2006.01) |
| *C08B 31/04* | (2006.01) |
| *C10L 1/16* | (2006.01) |
| *C10L 1/182* | (2006.01) |

(52) U.S. Cl.
CPC .............. *C09K 8/524* (2013.01); *C08B 31/04* (2013.01); *C08B 37/0054* (2013.01); *C08L 91/06* (2013.01); *C10G 75/04* (2013.01); *C10L 1/198* (2013.01); *C10L 10/14* (2013.01); *C11C 1/00* (2013.01); *F17D 3/12* (2013.01); *C10L 1/1608* (2013.01); *C10L 1/1616* (2013.01); *C10L 1/1641* (2013.01); *C10L 1/1824* (2013.01)

(58) Field of Classification Search
CPC .......... C09K 8/03; C09K 8/035; C09K 8/524; C10G 75/04; F17D 3/12
USPC .................................................. 507/100–277
See application file for complete search history.

(56) References Cited

U.S. PATENT DOCUMENTS

| | | | |
|---|---|---|---|
| 3,679,582 A | 7/1972 | Wagenaar et al. | |
| 4,997,580 A | 3/1991 | Karydas et al. | |
| 5,872,270 A | 2/1999 | van Dam et al. | |
| 2008/0009422 A1* | 1/2008 | Patel | C09K 8/035 507/110 |
| 2009/0258800 A1* | 10/2009 | Halliday | C09K 8/032 507/140 |
| 2011/0030961 A1* | 2/2011 | Maxey | C09K 8/28 166/310 |
| 2011/0136701 A1* | 6/2011 | Prebensen | C09K 8/03 507/111 |
| 2012/0090848 A1* | 4/2012 | Reddy | C09K 8/08 166/308.2 |
| 2014/0305650 A1* | 10/2014 | Song | C09K 8/685 166/308.3 |
| 2016/0108327 A1 | 4/2016 | Pulikkathara et al. | |

FOREIGN PATENT DOCUMENTS

| | | |
|---|---|---|
| JP | 2014-034522 A | 2/2014 |
| KR | 10-1104037 B1 | 1/2012 |

OTHER PUBLICATIONS

International Search Report and Written Opinion issued in Application No. PCT/US2017/065806; dated Mar. 29, 2018 (14 pages).
International Preliminary Report on Patentability dated Jun. 18, 2019, in corresponding International Application No. PCT/US2017/065806 (10 pages).

* cited by examiner

*Primary Examiner* — Ellen M McAvoy

(57) ABSTRACT

Compositions may include a wax modifier that is the product of a reaction between a polysaccharide having a number of sugar subunits in the range of 2 to 60 and one or more fatty acid reagents, and a reservoir fluid produced from a subterranean formation comprising one or more components capable of producing waxes. Methods may include contacting a hydrocarbon fluid with a wax modifier, wherein the wax modifier is the product of the reaction of a polysaccharide and one or more fatty acid reagents. Methods may also include introducing a wax modifier into a wellbore penetrating a subterranean formation, wherein the wax modifier is the product of a reaction between a polysaccharide and one or more fatty acid reagents; producing hydrocarbons from the subterranean formation; and allowing the wax modifier to inhibit the precipitation of a wax.

18 Claims, No Drawings

WAX MODIFIER IN HYDROCARBON FLUID AND METHOD OF USING THE SAME

BACKGROUND

In the oil and gas industry, fluids produced from subterranean formations often contain varying levels of hydrocarbons, associated aqueous phases, and dissolved and suspended solids. During production operations, hydrocarbons may be depressurized and cooled during capture and various flow assurance challenges can arise that may negatively affect production and other downstream processes. Among these considerations, it may be important to control of precipitation and deposition of solids such as hydrates, waxes, organic and inorganic scales, asphaltenes, corrosion products, and formation solids.

Solids present in hydrocarbon-containing produced from subterranean formations may be only slightly soluble at reservoir pressure and temperature. As produced fluids undergo pressure and temperature changes during production, solids may precipitate from the fluids and deposit on downhole tools, pipe wall surface, tubes, tanks, and other equipment. Solid deposition may cause additional operational problems such as poor oil and water separation, increased fluid viscosity, and pressure drops in the production and transportation pipelines; all of which can cause reductions in output and substandard oil and water quality.

In prior approaches, problems of solid deposition have been resolved by deploying a variety of physical and chemical methods. Deposition mitigation by chemical methods may involve the use of dispersants, solvents, modifiers, and other additives that alter the size and shape of the particles responsible for the formation of deposits. For example, chemical additives may operate by disrupting the growth of solid particles or other crystalline materials, leading to a decrease in the average size of these insoluble impurities and inhibiting precipitate formation. In addition, chemical additives may also disperse deposited solids and remediate scale and wax buildup.

SUMMARY

This summary is provided to introduce a selection of concepts that are described further below in the detailed description. This summary is not intended to identify key or essential features of the claimed subject matter, nor is it intended to be used as an aid in limiting the scope of the claimed subject matter.

In one aspect, embodiments of the present disclosure are directed to compositions that may include a wax modifier that is the product of a reaction between a polysaccharide having a number of sugar subunits in the range of 2 to 60 and one or more fatty acid reagents, and a reservoir fluid produced from a subterranean formation comprising one or more components capable of producing waxes.

In another aspect, embodiments of the present disclosure are directed to methods that may include contacting a hydrocarbon fluid with a wax modifier, wherein the wax modifier is the product of the reaction of a polysaccharide and one or more fatty acid reagents.

In another aspect, embodiments of the present disclosure are directed to methods that introducing a wax modifier into a wellbore penetrating a subterranean formation, wherein the wax modifier is the product of a reaction between a polysaccharide and one or more fatty acid reagents; producing hydrocarbons from the subterranean formation; and allowing the wax modifier to inhibit the precipitation of a wax.

Other aspects and advantages of the disclosure will be apparent from the following description and the appended claims.

DETAILED DESCRIPTION

This disclosure relates generally to compositions for inhibiting the agglomeration of waxes, asphaltenes, and other insoluble materials in hydrocarbon fluids. In one or more embodiments, wax modifiers in accordance with the present disclosure are the product of a reaction between a polysaccharide and a fatty acid reagent. In some embodiments, wax modifiers include fatty acid ester derivatives of polysaccharides such as inulin and dextrin. Embodiments of the present disclosure are also directed to methods of inhibiting wax and solid formation in hydrocarbons transported within a formation, through various types of pipeline, or stored in vessels.

Hydrocarbons fluids produced from the reservoir may undergo a number of changes in pressure and temperature as the fluids are brought to the surface. Changes in temperature and pressure affect the may change the solubility of various components within a hydrocarbon fluid, which may lead to the precipitation and subsequent deposition of solids such as paraffins and waxes.

Deposits generated from these materials may cause potential operational problems, such as the creation of buildups during production and/or transportation. Particularly, when insoluble paraffins or waxes condense onto cooled surfaces such as pipes walls and teller lines result in blockage on fluid flow. Blockages are often an issue when transporting hydrocarbons in subsea flowlines, where pipe walls may accumulate solid buildup. Further, sludge formation during shipping in storage tanks may result in the loss of a percentage of the shipped hydrocarbon.

In one aspect, embodiments of the instant disclosure directed to the treatment of wax formation in hydrocarbon fluids may be used to decrease the aggregation of paraffinic molecules and changing paraffin crystal morphology. Wax deposition is a temperature driven process in which poorly soluble hydrocarbons precipitate from solution as the temperature falls below the wax-appearance temperature (WAT). For example, when the temperature of a hydrocarbon fluid is above the WAT, wax-forming molecules remain soluble and mobile during transport. At the WAT, waxes begin to aggregate and precipitate out of solution. Below the WAT, formed aggregates and/or crystals may grow larger and migrate to pipe walls and form deposits that can impede flow and decrease production rate. As the temperature of the surrounding hydrocarbon cools and waxes precipitate, viscosity may increase as a function of decreasing temperature.

At the temperature of the reservoir, hydrocarbons may be primarily liquid or gaseous. As the production stream rises to the surface and leaves the wellhead, the temperature and pressure decrease, cooling the production stream relative to downhole conditions. Cooling of the production stream may have a number of effects, including gelling, undesirable rheology changes, or deposition of waxes, asphaltenes, and the like, which may affect downstream production operations. The wax deposits formed may contain n-paraffins, such as linear alkanes, and small amounts of branched or isoparaffins and aromatic compounds, such as cycloparaffins and naphthalenes. The carbon number of paraffinic molecules present in wax deposits is may be $C_{15}$ or higher and may reach up to $C_{80}$. Studies have also indicated that the quantity of wax formation that will prevent flow or gel for an oil is relatively small.

While some insolubility issues may be addressed by equipment modification, such as insulating or heating transport lines at the surface, these changes add to operation costs and cannot be applied to problems that originate downhole. In order to treat fluids downhole, approaches may involve "hot oiling" in which cure oil is heated the crystallization point of the heavy components and circulated through the well. Hot oiling techniques require bulky heat sources that may not be practical for all production systems. Further, some wax components have high crystallization point temperatures and may continue to build up over time despite hot oiling equipment surfaces and pipelines, leading to blockages and system impairment.

Wax modifiers in accordance with embodiments described herein may be added to wax-containing oils and paraffin-containing fluids such as liquid natural gas, crude oil, shale oil, petroleum, tar sands oil, and the like, to mitigate the effects of undesirable solids precipitation and subsequent deposition. In some embodiments, wax modifiers in accordance with the present disclosure may be used to disperse or dissolve existing waxes or aggregates. When added to hydrocarbon fluids, wax modifiers may stabilize poorly soluble components, delaying or eliminating their precipitation and reducing overall deposition. In one or more embodiments, wax modifiers may function by changing the crystal morphology and intermolecular interaction of wax molecules and other slightly soluble species. While not limited by any particular theory, it is proposed that this effect is due in part to an interaction between the wax modifier various insoluble materials alters the crystal structure of forming waxes. As a result, the formation of dense wax crystals and aggregates that lead to deposition is reduced.

During application, in one or more embodiments, wax modifiers may be injected from a surface source into wells or into flow lines to treat formation fluids to prevent or control precipitation. Methods in accordance with the present disclosure may include admixing an wax modifier with a hydrocarbon fluid in an effective amount, i.e., an amount sufficient to produce some reduction in the appearance of waxes or poorly soluble aggregates at decreased temperatures as compared to an untreated fluid. For example, wax modifiers may be added at a concentration that may range from a lower limit selected from any of 0.0001 percent by weight (wt %), 0.001 wt %, 0.1 wt %, 1 wt %, and 2 wt % to an upper limit selected from any of 1 wt %, 2 wt %, 5 wt %, 10 wt %, and 15 wt %, where the concentration of the wax modifier may range from any lower limit to any upper limit. In yet other embodiments, the concentration of the wax modifier may range from about 0.001 wt % to about 1 wt %.

However, one skilled in the art would appreciate that the desired concentration of wax modifier may depend on the type of fluid being treated, and that the desirable amount is an amount sufficient to achieve the highest variance in wax appearance temperature and viscosity at the lowest reasonable dosage. The final concentration (for a stationary body of hydrocarbon) or rate of addition (for a hydrocarbon stream) of wax modifier may vary according to a number of factors that may include the base fluid type, the paraffin content in the fluid, the carbon number distribution of the fluid, the type of modifier added, the degree of wax appearance temperature and viscosity corrections desired, the ambient conditions, presence of aqueous phases, and the like. The optimum dosage rate may be estimated by a number of laboratory measurements such as wax appearance temperature, viscosity, gel strength, wax deposition tendency, and the like. Therefore, there are no limitations in this regard.

In one or more embodiments, wax modifiers may include polysaccharides derivatized with alkyl chains or other hydrophobic domains. For example, modifiers may be structured so that part of the molecule contains a long-chain alkyl group soluble in the paraffin-containing fluid, while the polysaccharide backbone imparts some degree of solubility and dispersive properties. The alkyl chains present on the wax modifier may provide a number of nucleation sites and may co-crystallize with poorly soluble components in a hydrocarbon fluid, while the polysaccharide backbone of the modifier may incorporate on the surface of growing wax crystals, thus inhibiting extensive crystal growth by reducing the effective size of the wax crystals.

Polysaccharide Derivatives

In one or more embodiments, the wax modifiers may include polysaccharides derivatized with one or more fatty acid reagents. Polysaccharides in accordance with the present disclosure may include inulins and dextrins. Inulins are a group of naturally occurring polysaccharides that belong to a class of dietary fibers known as fructans. Structurally, inulins are chains of repeating fructose subunits having terminal glucose subunits. Inulin derivatives in accordance with the present disclosure may be of the general formula (I), where A may be varied between a group derived from one or more fatty acid reagents, or hydrogen, with the proviso that at least one A of the general formula (I) be a group derived from a fatty acid reagent, n is the degree of polymerization and may range from 2 to 60, and A' is a group derived from a fatty acid reagent, H, or the glucosyl derivative structure (II).

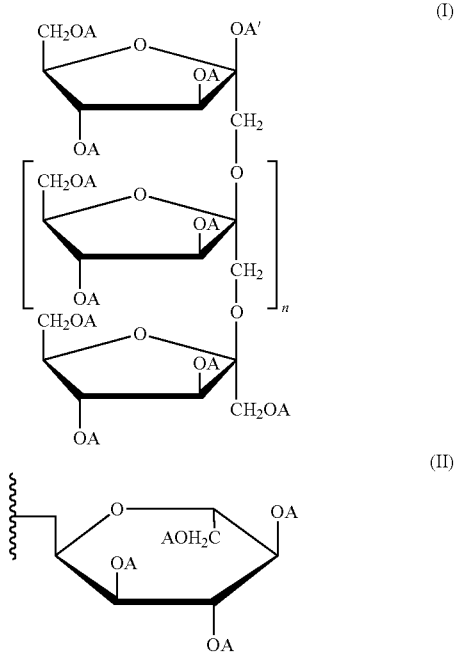

In some embodiments, wax modifiers may be an inulin derivatized with one or more stearic acid esters.

In one or more embodiments, wax modifiers in accordance with the present disclosure may be a dextrin derivative having the general structure of formula (III), where R is a group derived from one or more fatty acid or fatty acyl chloride reagents, or hydrogen, with the proviso that at least one R be a group derived from a fatty acid or fatty acyl acid reagent, and n is the degree of polymerization, which may range from 2 to 60.

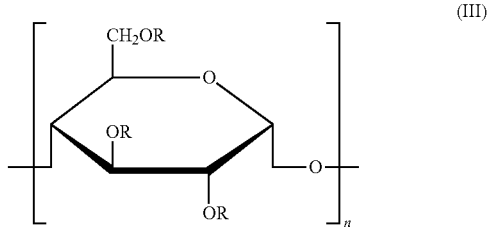

(III)

In some embodiments, wax modifiers may be a dextrin derivatized with one or more esters prepared from a fatty acid or fatty acyl chloride reagent selected from palmitic acid or 2-ethylhexylnoic acid, acyl chloride derivatives thereof, and mixtures thereof.

Polysaccharide derivatives in accordance with the present disclosure may have a molecular weight that varies from a number average molecular weight of 1 kDa to 100 kDa in some embodiments, and from 5 kDa to 50 kDa in some embodiments.

Fatty Acid Reagents

In some embodiments, the fatty acid reagent may be branched or linear fatty acids having a carbon number within the range of C6 to C30. In one or more embodiments, polysaccharide derivatives may include polysaccharides derivatized with a mixture of fatty acid reagents. In some embodiments, mixtures of fatty acid reagents may include reagents producing branched chain and linear esters. As used herein, "fatty acid reagents" include all reagents capable of generating a fatty ester when combined with a hydroxyl-containing species such as a polysaccharide, including fatty acids and activated derivatives thereof such as fatty acyl chlorides and activated esters such as carbodiimides or hydroxy-benzotriazole derivatives.

Fatty acid reagents may include linear fatty acids, derivatives thereof, and mixtures thereof such as butyric acid, valeric acid, caproic acid, enthanic acid, caprylic acid, pelargonic acid, capric acid, undecylic acid, lauric acid, tridecyclic acid, mysristic acid, pentadecylic acid, palmitic acid, margaric acid, stearic acid, and the like, in addition to unsaturated fatty acids, derivatives thereof, and mixtures thereof such as myristoleic acid, palmitoleic acid, oleic acid, linoleic acid, alpha-linoleic acid, erucic acid, ricinoleic acid, and the like. In one or more embodiments, the fatty acid reagent or derivative thereof may include a saturated aliphatic hydrocarbon group having 16 or more carbon atoms.

In some embodiments, saturated fatty acids may include branched fatty acids, derivatives thereof, and mixtures thereof, such as isobutyric acid, isovaleric acid, 2-ethylbutyric acid, ethylmethylacetic acid, isoheptanoic acid, 2-ethylhexanoic acid, isononanoic acid, isodecanoic acid, isotridecanoic acid, isomyristic acid, isopalmitic acid, isostearic acid, isoarachic acid, isohexacosanoic acid, and the like.

In one or more embodiments, polysaccharide derivatives may include those derivatized a mixture of fatty acid reagent types such as linear, branched, saturated, unsaturated, and the like. In some embodiments, polysaccharides may be derivatized with a mixture of branched fatty acid groups and linear fatty acid groups. Polysaccharides may be derivatized with a ratio of branched fatty acid reagents to linear fatty acid reagents that falls within the range of 1:2 to 1:10 in some embodiments, and within the range of 1:5 to 1:10 in other embodiments.

In one or more embodiments, wax modifiers may also be formulated with one or more solvents such as terpenes, such as d-limonene, turpentine, pinene, and citronellol, terpenoids, kerosene, xylene, and other aromatic solvents. Solvents in accordance with the present disclosure may be combined with a wax modifier at a percent by volume (vol %) ranging from a lower limit selected from one of 0.1 vol %, 0.5 vol %, 1 vol %, to an upper limit selected from one of 5 vol %, 10 vol %, and 20 vol %, where any lower limit may be combined with any upper limit.

EXAMPLES

In the following example, wax modifiers in accordance with the present disclosure were assayed in a mixture of various hydrocarbons and tested using a cold finger apparatus to determine the wax inhibition efficiency. Samples were formulated as a 10 percent by weight (wt %) solution in xylene and added to an aliquot of crude oil at a concentration of 2,000 ppm.

Sample 1 is a green wax modifier prepared from dextrin derivatized with a mixture of palmitate and 2-ethylhexanote having a number average molecular weight (Mn) of 11.1 kDa (RHEOPEARL™ TT2 from Chiba Flour Mill Co Ltd); Sample 2 is a stearoyl derivatized innulin having an Mn of 5.5 kDa (RHEOPEARL™ ISL2); Sample 3 is a stearoyl derivative of inulin having a number average molecular weight of 10.5 kDa (RHEOPEARL™ ISK2); and Sample C1 is a comparative alkyl alpha-olefin maleic anhydride wax modifier in a 10 wt % solution in xylene.

In general, a cold finger apparatus is a closed stainless steel tube into which a fluid at about 35° F. is circulated to initiate temperature-dependent precipitation in a sample. During testing, the cold finger was immersed into an oil sample heated to above the wax dissolution temperature (WDT) at 80° F. for the selected samples, and the sample was agitated using a magnetic stirrer. The cold finger was then cooled below the sample's wax appearance temperature (WAT) at 35° F. in order to initiate wax aggregation on the surface of the apparatus. Testing proceeded over a period of 20 hours, followed by removal and weighing of the wax deposited on the cold finger. Wax modifier efficiency then calculated based on the differential weight between treated and untreated oil samples from Eagle ford, South Texas. Results are shown in Table 1.

TABLE 1

Wax inhibition for selected wax modifiers at 2,000 ppm.

| | % Wax Inhibition (Method-I) | | | | | | | |
|---|---|---|---|---|---|---|---|---|
| Sample | Fluid 1 | Fluid 2 | Fluid 3 | Fluid 4 | Fluid 5 | Fluid 6 | Fluid 7 | Fluid 8 |
| 1 | 40.78 | 62.27 | 68.94 | 65.62 | 79.86 | 79.86 | 34.1 | 75.25 |
| 2 | 69.74 | 55.75 | 71.54 | 94.14 | 73.93 | 73.93 | 70.3 | 77.27 |
| 3 | 22.74 | 41.88 | 91.42 | 66.66 | 35.17 | 35.17 | 38.3 | 26.76 |
| C1 | 65.00 | 81.56 | 90.27 | 93.62 | 86.17 | 86.17 | 76.25 | 77.52 |

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A composition comprising:
   a wax modifier that is the product of a reaction between a polysaccharide having a number of sugar subunits in the range of 2 to 60 and a number average molecular weight between about 5 kDa and 50 kDa and one or more fatty acid reagents, and
   a reservoir fluid produced from a subterranean formation comprising one or more components capable of producing waxes and having a wax appearance temperature,
   wherein the wax modifier is added in an amount sufficient to produce a reduction in appearance of waxes at a temperature below the wax appearance temperature.

2. The composition of claim 1, further comprising one or more solvents selected from a group consisting of d-limonene, turpentine, pinene, and citronellol, terpenoids, kerosene, and xylene.

3. The composition of claim 1, wherein the polysaccharide is an inulin of the general formula (I), wherein A comprises one or more groups derived from one or more fatty acid reagents, or hydrogen, with the proviso that at least one A of the general formula (I) be a group derived from a fatty acid reagent, n is the degree of polymerization and may range from 2 to 60, and A' is group derived from a fatty acid reagent, H, or the glucosyl derivative structure (II),

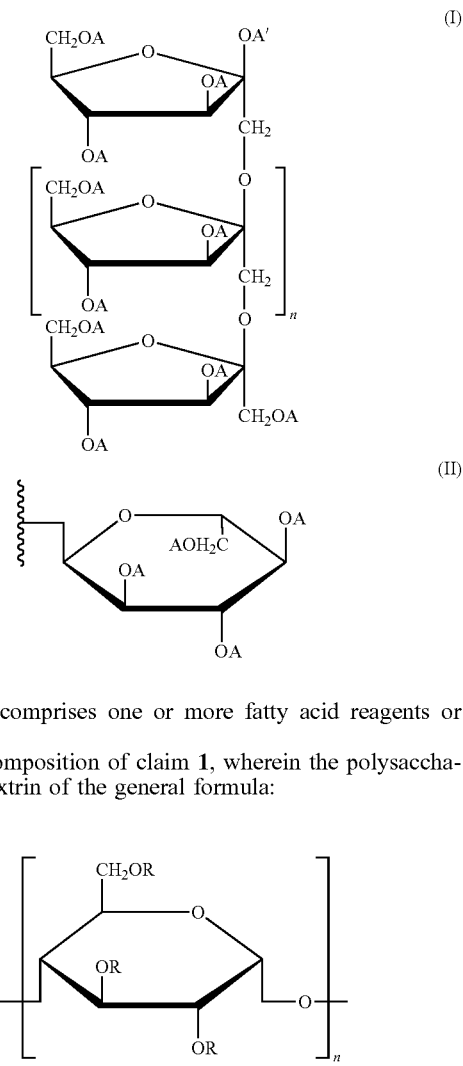

wherein A comprises one or more fatty acid reagents or hydrogen.

4. The composition of claim 1, wherein the polysaccharide is a dextrin of the general formula:

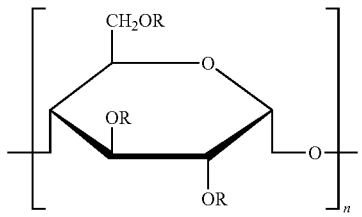

where R is one or more fatty acid reagents or hydrogen, with the proviso that at least one R be a fatty acid reagent, and n is the degree of polymerization, which may range from 2 to 60.

5. The composition of claim 1, wherein the fatty acid reagent is one or more selected from a group consisting of butyric acid, valeric acid, caproic acid, enthanic acid, caprylic acid, pelargonic acid, capric acid, undecylic acid, lauric acid, tridecyclic acid, mysristic acid, pentadecylic acid, palmitic acid, margaric acid, stearic acid, and the like, in addition to unsaturated fatty acids such as myristoleic acid, palmitoleic acid, oleic acid, linoleic acid, alpha-linoleic acid, erucic acid, ricinoleic acid, and derivatives thereof.

6. The composition of claim 1, wherein the wax modifier is an ester of inulin and stearic acid.

7. The composition of claim 1, wherein the wax modifier is an ester of dextrin and a mixture of 2-ethylhexyanoic acid and palmitic acid.

8. A method comprising:
contacting a hydrocarbon fluid having a wax appearance temperature with a wax modifier, wherein the wax modifier is the product of the reaction of a polysaccharide having a number average molecular weight between about 5 kDa and 50 kDa and one or more fatty acid reagents, and
inhibiting the growth of wax crystal in the hydrocarbon fluid at a temperature below the wax appearance temperature.

9. The method of claim 8, wherein the polysaccharide is an inulin of the general formula (I), wherein A comprises one or more groups derived from one or more fatty acid reagents, or hydrogen, with the proviso that at least one A of the general formula (I) be a group derived from a fatty acid reagent, n is the degree of polymerization and may range from 2 to 60, and A' is group derived from a fatty acid reagent, H, or the glucosyl derivative structure (II), $$\text{(I)}$$

$$\text{(II)}$$

wherein A comprises one or more fatty acid reagents or hydrogen.

10. The method of claim 8, wherein the polysaccharide is a dextrin of the general formula:

where R is one or more groups derived from a fatty acid reagent or hydrogen, with the proviso that at least one R be a group derived from a fatty acid reagent, and n is the degree of polymerization, which may range from 2 to 60.

11. The method of claim 8, wherein the wax modifier is an ester of inulin and stearic acid.

12. The method of claim 8, wherein the wax modifier is an ester of dextrin and a mixture of 2-ethylhexyanoic acid and palmitic acid.

13. The method of claim 8, wherein the number average molecular weight of the polysaccharide is between about 5 kDa and 50 kDa.

14. The method of claim 8, wherein modifier is added to the hydrocarbon fluid at a concentration in the range of 0.001 wt % to 10 wt %.

15. A method comprising:
introducing a wax modifier into a wellbore penetrating a subterranean formation, wherein the wax modifier is the product of a reaction between a polysaccharide having a number average molecular weight between about 5 kDa and 50 kDa and one or more fatty acid reagents;
producing hydrocarbons from the subterranean formation, the hydrocarbons having a wax appearance temperature; and
allowing the wax modifier to inhibit the precipitation of a wax at a temperature below the wax appearance temperature.

16. The method of claim 15, wherein the polysaccharide is an inulin of the general formula (I), wherein A comprises one or more groups derived from one or more fatty acid reagents, or hydrogen, with the proviso that at least one A of the general formula (I) be a group derived from a fatty acid reagent, n is the degree of polymerization and may range from 2 to 60, and A' is group derived from a fatty acid reagent, H, or the glucosyl derivative structure (II), $$\text{(I)}$$

$$\text{(II)}$$

wherein A comprises one or more fatty acid reagents or hydrogen.

17. The method of claim 15, wherein the polysaccharide is a dextrin of the general formula:

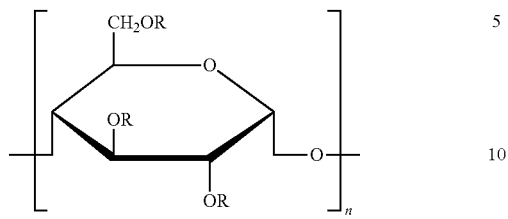

where R is one or more groups derived from a fatty acid reagent or hydrogen, with the proviso that at least one R be a group derived from a fatty acid reagent, and n is the degree of polymerization, which may range from 2 to 60.

18. The method of claim 15, wherein the fatty acid reagent is one or more selected from a group consisting of butyric acid, valeric acid, caproic acid, enthanic acid, caprylic acid, pelargonic acid, capric acid, undecylic acid, lauric acid, tridecyclic acid, mysristic acid, pentadecylic acid, palmitic acid, margaric acid, stearic acid, and the like, in addition to unsaturated fatty acids such as myristoleic acid, palmitoleic acid, oleic acid, linoleic acid, alpha-linoleic acid, erucic acid, ricinoleic acid, and derivatives thereof.

* * * * *